No. 819,544. PATENTED MAY 1, 1906.
A. HÉRISSON.
FRICTION CLUTCH.
APPLICATION FILED NOV. 22, 1904.

Witnesses.

Inventor
Albert Hérisson
By James L. Norris
Atty

UNITED STATES PATENT OFFICE.

ALBERT HÉRISSON, OF NIMES, FRANCE.

FRICTION-CLUTCH.

No. 819,544.     Specification of Letters Patent.      Patented May 1, 1906.

Application filed November 22, 1904. Serial No. 233,861.

*To all whom it may concern:*

Be it known that I, ALBERT HÉRISSON, engineer, a citizen of the French Republic, residing at Nimes, Department of the Gard, France, have invented certain new and useful Improvements in Friction-Clutches, of which the following is a specification.

This invention consists in providing friction-clutches with a cup-shaped member, part of the circumferential wall of which is rendered expansible, while the other part is rigid. This arrangement is intended for all clutches in which the pressure on the inner wall of the cup-shaped member is not the same on the whole of the circumference, but is greater on certain points of the rubbing-surface. When these points are on the expansible part of the cup-shaped member, the progress of the movable part of the clutch is much facilitated and the power of the clutch greatly increased.

I will describe, with reference to the accompanying drawings, manners in which my invention can be carried into practical effect.

Figure 2:
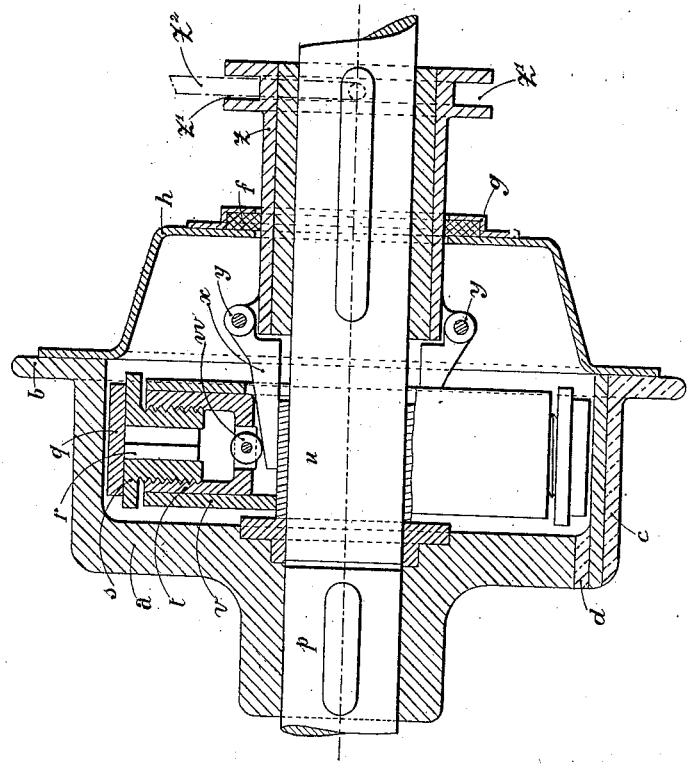
Figure 1:
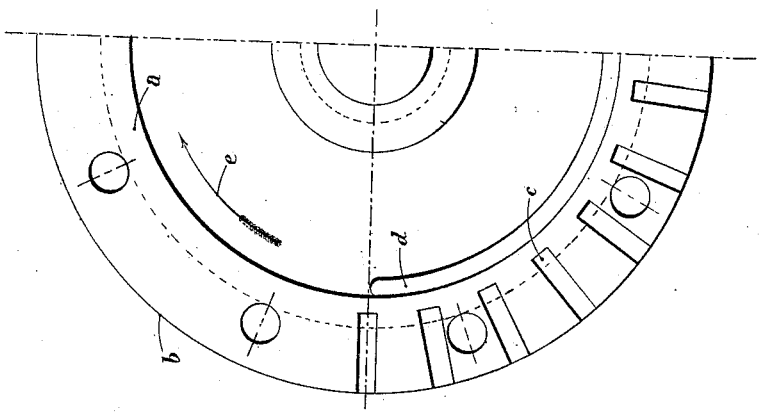

Figure 1 is a half end view of the cup-shaped member, the cover being removed; and Fig. 2 is a longitudinal section of part of the clutch, together with the said cup-shaped member.

In the arrangement shown in Figs. 1 and 2 the cup-shaped member $a$ is rendered rigid by making the peripheral walls and the flange $b$ on the open side of suitable thickness, and a part of the cup-shaped member $a$, say one-half, is provided with notches $c$, common to the wall of the cup-shaped member and its flange. Besides these notches a partially-circular slot $d$ separates the notched half of the wall from the bottom of the cup-shaped member and allows of the said notched wall and flange freely expanding.

The movable portion of the clutch comprises two diametrically opposite shoes $q$, mounted by a square pin $r$ in a piece $s$, screwed in a socket $t$, which can slide in a direction perpendicular to the axis of the shafts $p\,n$ in a bearing $y$, rotating with the secondary shaft $u$. The adjusting by screwing of the piece $s$ in the socket $t$ allows the distance between the shoes and the axis of the shaft $u$ to be exactly regulated. At the end of the sockets $t$ are mounted rollers $w$, on which bear wedges $x$, jointed to the lugs $y$ of a sleeve $z$, sliding on the shaft $u$, by means of a lever $z^2$, engaged in an annular groove $z'$ of said sleeve.

If the lever is acted on in order that the sleeve $z$ be brought nearer the shaft $p$, the wedges $w$ moving the shoes radially away from the axis of the shaft $u$, these shoes exert a strong pressure directly from the inside to the outside only on a small portion of the internal wall of the cup-shaped member $a$. (The arrow $e$ indicates the direction of rotation.) Then when the rubbing part of the said movable part of the clutch reaches the expansible part of the cup the said cup is distended under the action of the pressure, and the movable member of the clutch will enter farther into the cup-shaped member. When the movable part reaches the rigid portion of the cup-shaped member, if the pressure-exerting parts be not reversible the pressure of the rubbing part, and consequently the friction, will be considerably increased relatively to the amount of thrust then exerted on the clutch-controlling gear. The power of the clutches provided with this cup-shaped member is only limited by the strength of the parts, and if the elastic part of the cup-shaped member has sufficient elasticity a light pressure on the clutch-collar will produce a considerable progress of the movable part of the clutch. With this cup-shaped member metallic rubbing-surfaces immersed in oil may be used. In order to prevent the oil from escaping, the notches $c$ in the peripheral wall and in the flange and the partially-circular slot $d$ in the bottom of the cup-shaped member $a$ are filled with a soft metal which should as nearly as is practicable have the same density as the metal of the cup-shaped member $a$, so as to insure proper balance.

The cup-shaped member $a$ is closed by two elastic half-covers $h$, of flanged metal. A leather or like washer $f$, held in position by a flange $g$, attached to the halves of the cover, insures a tight joint between the cover and the shaft.

The possibility given to the clutch-operating body to penetrate more easily at some points of the wall of the cup-shaped member $a$ than in others may also be obtained by other arrangements, such as by decreasing the thickness of the wall through a certain extent of the said wall or by providing the outer side of the said wall with ribs at one place or more than one place or by using two half-covers of different kinds, one rigid and the other capable of extending, or by making the inner part of the cup-shaped member partly oval.

Having now particularly described and ascertained the nature of the said invention and in what manner the same is to be performed, I declare that what I claim is—

1. In a friction-clutch, a cup-shaped member having a portion of its circumferential wall expandible and the other portion extending from and to said expandible portion rigid, thereby causing the movable part of the clutch to press unequally on the walls of the said cup-shaped member and to progress more readily when the points of maximum pressure are in and against the expandible portion of the cup-shaped member, thus determining a considerable increase of pressure when they reach the undeformable part of the cup-shaped member, substantially as hereinbefore described.

2. A friction-clutch having as a part thereof, a cup-shaped member having a portion thereof provided with a plurality of recesses and a slot and the other portion rigid so as to permit of the movable part of the clutch pressing unequally on the walls of said cup-shaped member to progress more readily when the points of maximum pressure are in said recessed and slotted portion, thus determining a considerable increase of pressure when they reach the rigid portion of the cup-shaped member.

In testimony whereof I have hereunto set my hand in presence of two subscribing witnesses.

ALBERT HÉRISSON.

Witnesses:
   JOHN BAKER,
   PAUL BLUM.